United States Patent Office 3,660,369
Patented May 2, 1972

---

3,660,369
METHOD OF PREPARING LINEAR POLYMERS OF CYCLOOLEFINS
Vitaly Abramovich Kormer, Ulitsa Zheleznovodskaya 62, kv. 2; Boris Davidovich Babitsky, Ulitsa Krasnogo Kursanta 7, kv. 9; Tatyana Lvovna Jufa, Ulitsa Mayakovskogo 3, kv. 23; and Irina Alexandrovna Poletaeva, Ulitsa III Internatsionala 74, kv. 212, all of Leningrad, U.S.S.R.
No Drawing. Filed Sept. 2, 1969, Ser. No. 854,733
Claims priority, application U.S.S.R., Sept. 6, 1968, 1,269,161; May 8, 1969, 1,326,641, 1,326,642
Int. Cl. C08f 7/00, 1/36
U.S. Cl. 260—93.1
5 Claims

ABSTRACT OF THE DISCLOSURE

A method for the production of linear polymers of cyclomonoolefins which consists in the polymerization of cyclomonoolefins in the temperature range of from $-50°$ to $+80°$ C. in the presence of a catalyst comprising $\pi$-complexes of metals of Groups IV–VIII of the Periodic System taken in combination with halides of elements of Groups III–VI of the Periodic System.

---

This invention relates to methods for the preparation of linear polymers of cyclomonoolefins which may find application in the tire and mechanical rubber goods industries as general-purpose rubbers.

There are known methods for the preparation of linear polymers of cycloolefins by cycloolefin polymerization at a temperature of from $-50°$ to $+80°$ C. in the presence of Ziegler-Natta catalysts or the salts or oxides of metals of Groups IV–VIII of the Periodic System.

For example, norbornene polymers are prepared by the polymerization of norbornene in the presence of catalysts, viz, molybdenum pentachloride, tungsten hexachloride or rhenium pentachloride.

Linear polymers of cyclopentene are prepared according to the prior art by subjecting cyclopentene to polymerization in the presence of catalysts, e.g. the salts of metals of Groups IV–VIII of the Periodic System in conjunction with organometallic compounds or hydrides of elements of Groups I–III of the Periodic System.

The known methods suffer from the disadvantage of providing a low yield of target products due to the employment of insufficiently efficient catalysts.

It is the principal object of the present invention to provide a novel catalyst for a process of synthesizing linear polymers of cyclomonoolefins by the polymerization of cyclomonoolefin at a temperature of from $-50°$ to $+80°$ C.

In accordance with this and other objects, the present invention consists in the provision of a catalyst comprising $\pi$-complexes of metals of Groups IV–VIII of the Periodic System taken in combination with halides of elements of the Groups III–VI of the Periodic System.

Particularly effective are catalysts comprising $\pi$-allylic complexes of tungsten having the general formula

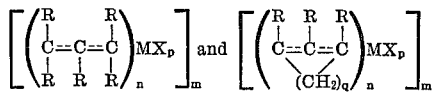

wherein
R is hydrogen, alkyl, cycloalkyl, aryl, or halogen;
M designates tungsten;
X stands for a monovalent anion;
$n=1–4$; $m=1–2$; $p=0–2$, and $q=1–9$ taken in combination with halides of elements of the Groups III–VI of the Periodic System.

The halides of elements of the Groups III–VI of the Periodic System include, for example, halides of boron, aluminium, gallium, silicon, titanium, zirconium, tin, vanadium, molybdenum and tungsten.

It is also expedient to employ catalysts comprising $\pi$-allylic complexes of metals of Groups IV–VIII of the Periodic System having the general formula

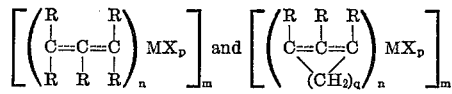

wherein

R is hydrogen, alkyl, cycloalkyl, aryl, or halogen;
M designates a metal of Groups IV–VIII of the Periodic System;
X stands for a monovalent anion;
$n=1–4$; $m=1–2$; $p=0–2$, and $q=1–9$ taken in combination with tungsten halides.

In another preferred embodiment of the present method, the linear polymers of cyclomonoolefins are obtained in presence of catalysts comprising $\pi$-complexes of metals of Groups IV–VIII of the Periodic System having the general formula $$M(L)_n$$

wherein L stands for CO, $C_5H_5$, $C_8H_{12}$, $C_6H_6$, $C_{12}H_{18}$, $PCl_3 \cdot P(Ph)_3$, $P(OPh)_3$ or various combination thereof, and $n=1–8$, taken in combination with tungsten halides.

Cyclomonoolefin polymerization in the presence of the above identified catalysts may be carried out in a hydrocarbon or halogenated hydrocarbon solvent medium, as well as in a solvent medium consisting of ethers.

The present method for the preparation of linear polymers of cyclomonoolefins is realized in the following manner.

The cyclomonoolefin is subjected to polymerization for a period of 0.1–20 hours in the presence of catalyzing quantities of the aforesaid catalyst, the polymerization temperature being in the $-50°$ to $+80°$ C. range. The polymerization may be conducted either in or without the aforespecified solvent media. The molar ratio of catalyst components and catalyst concentration are selected depending upon the requisite rate of polymerization and the desired molecular weight of the target polymer. The resultant polymer finds application in the preparation of rubber blends and vulcanizates derived therefrom.

For a better understanding of the present invention, the following examples of preparing linear polymers of cyclomonoolefins are given by way of illustration.

EXAMPLE 1

Into a glass ampoule are introduced $0.37 \times 10^{-3}$ mole of tetra-$\pi$-crotyl)-tungsten, $(\pi\text{-}C_4H_7)_4W$ in 10 ml. of benzene and $1.5 \times 10^{-3}$ mole of aluminium bromide in 5 ml. of benzene, followed by adding thereinto 7.7 g. of cyclopentene. The process of polymerization is carried out at a temperature of 30° C. for a period of 5 hours. The resultant polymer is treated with ethyl alcohol acidified with a small amount of hydrochloric acid in the presence of 20 mg. of diphenyl-p-phenylenediamine. The polymer is obtained in a yield of 7 g. (90% of the theoretical amount). The polymer contains cis- and trans- double bonds to the extent of 10% and 90%, respectively; intrinsic viscosity of the polymer $\eta=2.87$ dl./g.

EXAMPLE 2

Into a glass ampoule are introduced $2 \times 10^{-3}$ mole of tungsten hexachloride and $1 \times 10^{-3}$ mole of nickel tetracarbonyl, followed by adding thereinto 7.7 g. of cyclopentene. The process of polymerization is carried out at a temperature of 30° C. for a period of 3 hours. The resultant polymer is treated as disclosed in Example 1. The polymer is obtained in a yield of 4.7 g. (60% of the theoretical amount). In the polymer, the content of cis- and trans-double bonds is 60% and 40%, respectively; intrinsic viscosity, $\eta=4.5$ dl./g.

EXAMPLE 3

Into a glass ampoule are placed $0.375 \times 10^{-3}$ mole of tetra-($\pi$-crotyl)-tungsten in 10 ml. of toluene and $0.75 \times 10^{-3}$ mole of titanium tetrachloride in 5 ml. of toluene, followed by introducing theerinto 8.4 g. of cyclooctene. The process of polymerization is carried out at a temperature of 30° C. for a period of 16 hours. The resultant polymer is treated as disclosed in Example 1.

The polymer is obtained in a yield of 7.5 g. (90% of the theoretical amount). In the polymer, the content of cis- and trans-double bonds equals 30% and 70%, respectively; intrinsic viscosity, $\eta=2.5$ dl./g.

EXAMPLE 4

Into a glass ampoule are placed $0.37 \times 10^{-3}$ mole of tetra-($\pi$-allyl)-tungsten in 5 ml. of benzene and $0.75 \times 10^{-3}$ mole of aluminium bromide in 5 ml. of benzene, followed by incorporating thereinto 16 g. of cyclodecene in 5 ml. benzene. The process of polymerization is carried out at a temperature of 50° C. for a period of 10 hours. The resultant polymer is treated as disclosed in Example 1.

The polymer is obtained in a yield of 15 g. (95% of the theoretical amount). In the polymer, the content of cis- and trans-double bonds equals 20% and 80%, respectively; intrinsic viscosity, $\eta=3.0$ dl./g.

EXAMPLE 5

Into a glass ampoule are placed $0.375 \times 10^{-3}$ mole of tetra-($\pi$-crotyl)-tungsten in 10 ml. of diethyl ether and $0.75 \times 10^{-3}$ mole of molybdenum pentachloride in 5 ml. of diethyl ether, followed by introducing thereinto 7.7 g. of cyclopentene. The process of polymerization is carried out at a temperature of 30° C. for a period of 16 hours.

The polymer is obtained in a yield of 3.1 g. (40% of the theoretical amount). In the polymer, the content of cis- and trans-double bonds equals 85% and 15%, respectively; intrinsic viscosity, $\eta=2.5$ dl./g.

EXAMPLE 6

Into a glass ampoule are placed $0.375 \times 10^{-3}$ mole of tetra-($\pi$-methallyl)-zirconium, $(\pi\text{-}C_4H_7)_4Zr$ in 10 ml. of toluene and $0.75 \times 10^{-3}$ mole of tungsten hexachloride in 5 ml. of toluene, followed by incorporating thereinto 7.7 g. of cyclopentene. The process of polymerization is carried out at a temperature of $-30°$ C. for a period of 20 hours. The resultant polymer is treated as disclosed in Example 1.

The polymer is obtained in a yield of 4.6 g. (60% of the theoretical amount). In the polymer, the content of cis- and trans-double bonds equals 65% and 35%, respectively; intrinsic viscosity, $\eta=3.2$ dl./g.

EXAMPLE 7

Into a glass ampoule are placed $2 \times 10^{-3}$ mole of tungsten hexachloride and $1 \times 10^{-3}$ mole of tetra-(trichlorophosphine)-nickel, followed by incorporating thereinto 7.7 g. of cyclopentene. The process of polymerization is carried out at a temperature of 30° C. for a period of 16 hours. The resultant polymer is treated as disclosed in Example 1.

The polymer is obtained in a yield of 6.2 g. (80% of the theoretical amount). In the polymer, the content of cis- and trans-double bonds equals 40% and 60%, respectively; intrinsic viscosity, $\eta=4.2$ dl./g.

Although the present invention has been described with reference to the preferred embodiment thereof, many modifications and changes will occur to those skilled in the art. It is, therefore, to be understood that such modifications and changes are to be considered as falling within the true spirit and scope of the invention.

We claim:

1. A method for the preparation of linear polymers of cyclomonoolefins comprising subjecting cyclomonoolefins having from 5 to 12 carbon atoms in the ring to polymerization in the temperature range of from $-50°$ C. to $+80°$ C. in the presence of a catalytic amount of a catalyst consisting of halides of elements of Groups III–VI of the Periodic System taken in combination with $\pi$-complexes of metals of Groups IV–VIII of the Periodic System, said complexes being selected from the group represented by the general formulae:

wherein:

M is a metal of Groups IV–VIII of the Periodic System: $R^1$, $R^2$, $R^3$, $R^4$, $R^5$, $R^6$, $R^7$ and $R^8$ are selected from the group consisting of hydrogen, halogen, alkyl, cycloalkyl and aryl;

X denotes a monovalent anion;

L is selected from the group consisting of CO, $C_5H_5$, $C_8H_{12}$, $C_6H_6$, $C_{12}H_{18}$, $PCl_3$, $P(C_6H_5)_3$, $P(OC_6H_5)_3$ or combinations thereof: $n=1$–4; $m=1$–2; $p=0$–2; $q=1$–9, and $s=1$–8.

2. A method of claim 1 wherein the polymerization process is conducted in an inert organic solvent selected from the group consisting of hydrocarbons, chlorinated hydrocarbons and ethers.

3. A method according to claim 2, wherein the polymerization process is carried in a hydrocarbon solvent medium.

4. A method according to claim 2, wherein the polymerization process is carried out in a chlorinated hydrocarbon solvent medium.

5. A method according to claim 2, wherein the polymerization process is carried in an ether medium.

References Cited

UNITED STATES PATENTS

| | | | |
|---|---|---|---|
| 3,379,706 | 4/1968 | Wilke | 260—94.3 |
| 3,449,310 | 6/1969 | Dall'Asta et al. | 260—93.1 |
| 3,501,415 | 3/1970 | Herwig et al. | 252—429 |

FOREIGN PATENTS

| | | | |
|---|---|---|---|
| 1,105,565 | 3/1968 | Great Britain | 260—93.1 |

JOSEPH L. SCHOFER, Primary Examiner

R. A. GAITHER, Assistant Examiner